United States Patent [19]

Ichikawa et al.

[11] Patent Number: 5,595,581
[45] Date of Patent: Jan. 21, 1997

[54] EXHAUST GAS FILTER AND APPARATUS FOR TREATING EXHAUST GASES

[75] Inventors: Yukihito Ichikawa; Yoshiyuki Kasai; Yoshiro Ono, all of Nagoya, Japan

[73] Assignee: NGK Insulators, Ltd., Japan

[21] Appl. No.: 466,776

[22] Filed: Jun. 6, 1995

[30] Foreign Application Priority Data

Jun. 10, 1994 [JP] Japan ..................................... 6-128750

[51] Int. Cl.⁶ .................................................. B01D 46/00
[52] U.S. Cl. .......................... 55/302; 55/523; 55/DIG. 30
[58] Field of Search .............................. 55/282, 288, 302, 55/523, DIG. 30; 60/311

[56] References Cited

U.S. PATENT DOCUMENTS

| | | | |
|---|---|---|---|
| 4,420,316 | 12/1983 | Frost et al. | 55/DIG. 30 |
| 4,428,758 | 1/1984 | Montierth | 55/DIG. 30 |
| 4,604,869 | 8/1986 | Yoshida et al. | 55/DIG. 30 |
| 4,935,042 | 6/1990 | Sudo et al. | 55/DIG. 30 |
| 4,971,769 | 11/1990 | Haerle | 55/DIG. 30 |
| 5,228,892 | 7/1993 | Akitsu et al. | 55/302 |
| 5,426,936 | 6/1995 | Levendis et al. | 55/DIG. 30 |

FOREIGN PATENT DOCUMENTS 62-10422  3/1987  Japan .

Primary Examiner—C. Scott Bushey
Attorney, Agent, or Firm—Parkhurst, Wendel & Burr, L.L.P.

[57] ABSTRACT

An exhaust gas filter is provided, including a honeycomb structure having a plurality of partition walls defining through-holes extending along an axial direction. The through-holes include first and second groups. The first group is plugged via first sealing members at a second axial end of the honeycomb structure, while the second group is plugged via second sealing members at the first axial end of the honeycomb structure. The first group of through-holes is adapted to receive exhaust gas, and trap therein fine particles. The first sealing members have a three-dimensional micropore structure that includes interconnected pores to allow blowback air to pass therethrough. The blowback air flows through both the first sealing members and the partition walls defining the second through-holes so as to remove the fine particles that have collected in the first through-holes. Additionally, an apparatus is provided including the honeycomb structure and a device for receiving particles that are removed from the honeycomb structure via flow of the blowback air.

5 Claims, 3 Drawing Sheets

FIG_2
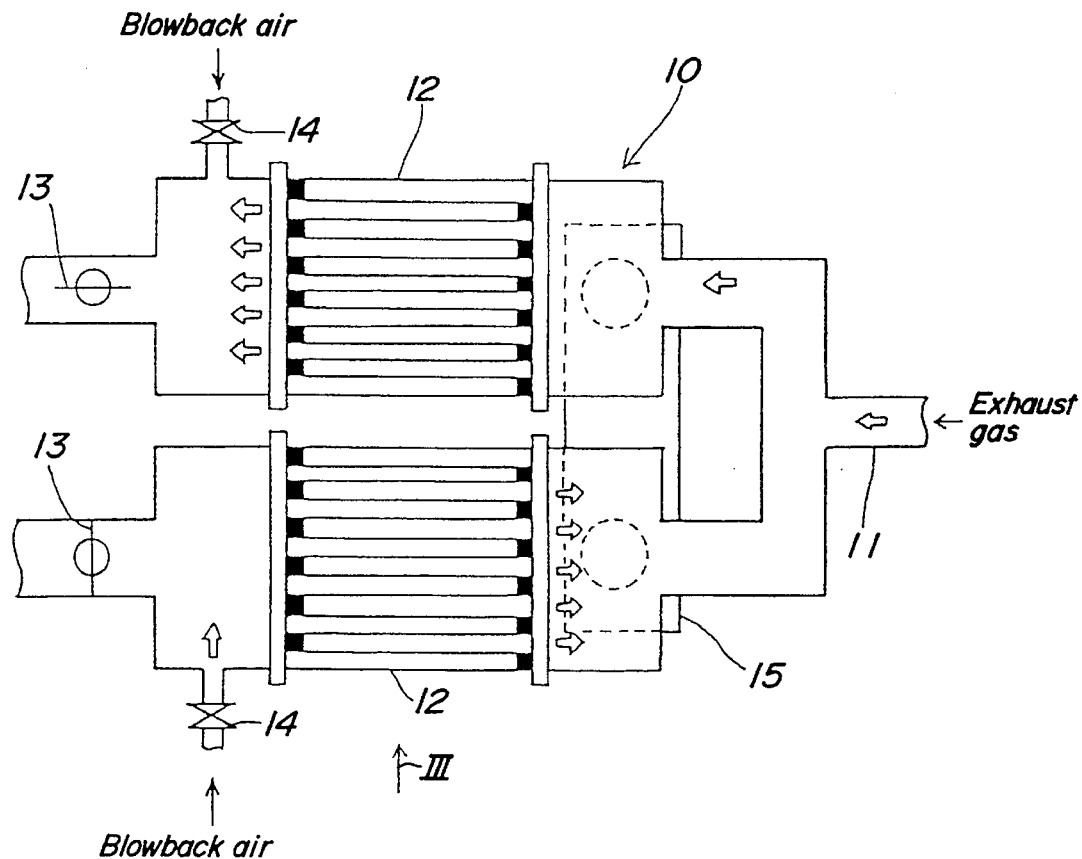
FIG_3
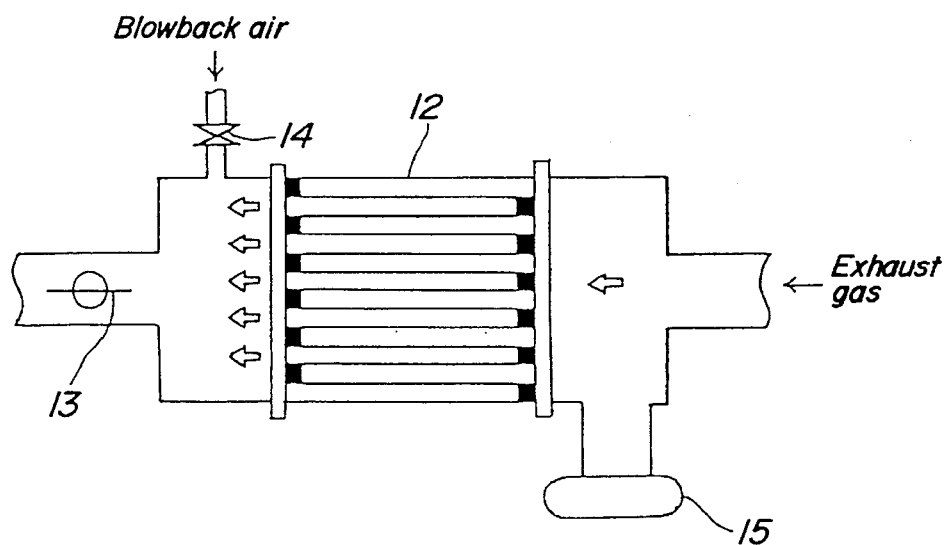

FIG_4
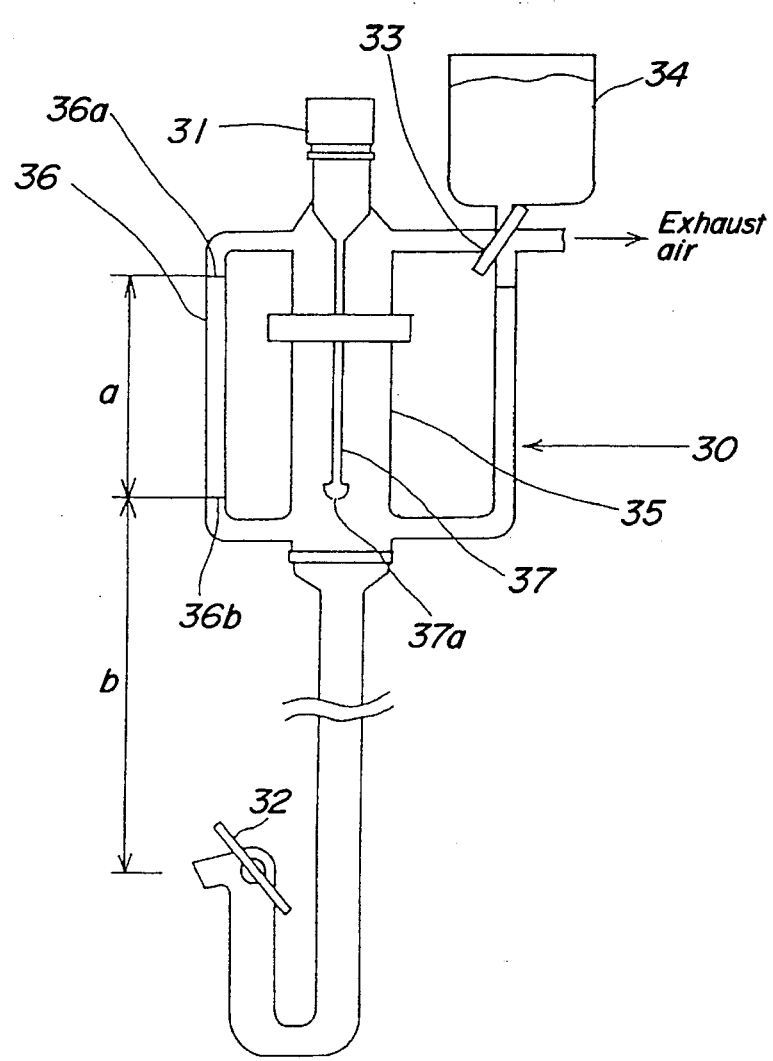
FIG_5
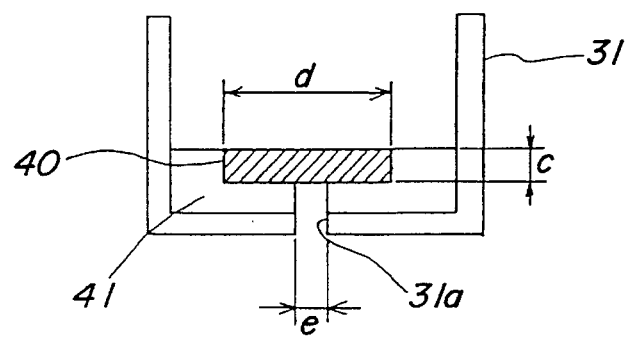

EXHAUST GAS FILTER AND APPARATUS FOR TREATING EXHAUST GASES

BACKGROUND OF THE INVENTION

1. Field of the Invention

The present invention relates to exhaust gas filters for collecting fine particles comprising, as a main component, carbon, being contained in exhaust gases of internal combustion engines or the like (hereinafter referred to as "internal combustion engines") and removing deposits of the particles by means of gas streams counter to exhaust gas flow.

2. Description of the Prior Art

Exhaust gases from diesel engines contain fine particles comprising, as a main component, carbon in a high concentration, which cause environmental disruption, such as air pollution or the like. Japanese Utility Model Publication No. 10422/'87 discloses various exhaust gas filters for collecting and removing such fine particles contained in the diesel engine exhaust gases.

The filters disclosed in the above Utility Model Publication comprise a honeycomb structure in which honeycomb-cells for gas flow passage are divided into two groups: the first group of the cells each having its rear aperture plugged up and the second group of the cells each having its front aperture plugged up, with a sealing member. In the first group, each of the cells is plugged up with a sealing member which has through-pores of small diameters formed therein so as to allow exhaust gases to pass. With the exhaust gas filters of such a structure, fine particles contained in exhaust gases are collected on thin partition walls defining gas flow passages, while incombustible components of larger diameters, contained in the exhaust gases, are discharged from the through-pores provided on the sealing members of the first cell group to outside the filter. Consequently, since only combustible fine particles deposit inside the filter, the collected fine particles can be removed by burning up by means of periodically igniting of the filter.

However, such conventional exhaust gas filters pose a problem in that not only do these filters require a means for collecting incombustible particles discharged through the through-pores to the outside of the filters, but also, even though the through-pores are provided in the sealing members, blocking of the thin partition walls of the filters is increased as the deposits are built up right below the sealing members in the first cell group and, in addition, the fine particles collected in the filter can not completely be removed by ignition.

It would be assumable that such a problem could be solved by intermittently injecting blowback air counter to exhaust gas flow, from the sealed side of the first cell group, to thereby release the fine particles or incombustible particles deposited on the inner walls of the filter and then treating the released deposits. However, this treating technique raises another problem such that the blowback air can remove particles only within a very narrow range right below the through-pores, so that the most part of the built-up deposits remains.

SUMMARY OF THE INVENTION

In order to solve problems such as described above, the present invention aims to provide exhaust gas filters and apparatuses for treating exhaust gases, which have an excellent efficiency in collecting fine particles contained in exhaust gases, without increasing pressure losses, by improving an efficiency of releasing fine particle deposits during blow-back.

The exhaust gas filter according to the present invention for solving the above problems, comprises a honeycomb structure having a number of gas flow passages defined by partition walls, for exhaust gases to flow therethrough, which gas flow passages are divided into two groups: a first group, each gas flow passage therein being plugged up at its downstream end portion with a first sealing member; and a second group, each gas flow passage therein being plugged up at its upstream end portion with a second sealing member, which filter is characterized in that the above first sealing member is provided with micropores three-dimensionally connected with each others to thereby allow blowback air to pass therethrough.

In exhaust gas filters according to a preferred embodiment of the present invention, the air permeation time, determined according to the air permeability test explained hereinafter, of the above first sealing members is desired to be 10–70% of the air permeation time of the above honeycomb structure, determined according to the air permeability test, for maintaining a high collection efficiency, without increasing pressure losses.

Additionally, according to another preferred embodiment of the present invention, the above first sealing members of the exhaust gas filters are desired to have a depth 10–60 times the thicknesses of the above partition walls, for improving mechanical strength of the first sealing members, without increasing pressure losses.

Furthermore, according to a further preferred embodiment of the present invention, the porosity of the above first sealing members of the exhaust gas filters is desired to be 110–140% of the porosity of the above honeycomb structure, for maintaining a high collection efficiency and decreasing pressure losses.

Furthermore, the exhaust gas filters according to the present invention are preferably used in an apparatus for treating exhaust gases, which apparatus comprises exhaust gas filters as defined above and a device for receiving fine particles from the exhaust gas filters, and is characterized in that, in a collection mode as defined hereinafter, fine particles contained in exhaust gases deposit on the partition walls and right below the first sealing members and, in a blowback mode as defined hereinafter, blowback air is injected intermittently down and counter to the exhaust stream, whereby the fine particles deposited on the exhaust gas filters are released and pneumatically conveyed to said device for receiving fine particles wherein the collected fine particles are disposed of.

According to the exhaust gas filters of the present invention, the first sealing member that plugs up the gas flow passage of the first group at its end portion downstream the exhaust gas, in the honeycomb structure, is formed into porous so as to allow blowback air to pass therethrough. Therefore, when the blowback air flows from the downstream side of the exhaust gas, fine particles deposited right below the first sealing member are effectively released, so that blocking of the partition walls and increase of pressure losses of the exhaust gas filter can be prevented. On the other hand, since the first sealing members allow gases to pass through but scarcely allow fine particles contained in exhaust gases to pass through, an efficiency of collecting the fine particles will not be deteriorated.

According to a preferred embodiment of the present invention, since the first sealing members of the exhaust gas filters have a depth 10–60 times the thicknesses of the partition walls, the mechanical strength of the first sealing members can be retained, substantially without increasing pressure losses, so that breakage of the sealing member can be decreased. By the depth of the sealing member is meant a length of the first sealing member in the direction of the exhaust flow.

In the apparatus for treating exhaust gases which employs the exhaust gas filters according to the present invention, fine particles contained in the exhaust gases which are collected in the exhaust gas filters are released and pneumatically conveyed to outside the exhaust system by intermittently injecting blowback air down and counter to the exhaust flow. Accordingly, the apparatus is effective to prevent blocking by blowback and proper regeneration, which improves performance in treatment and removal of the fine particles contained in the exhaust gases. Additionally it has a further effect on continual decrease in quantity of environmentally noxious fine particles discharged into atmosphere.

BRIEF DESCRIPTION OF THE DRAWING

The above and other objects, features and advantages of the present invention will become more apparent from reading the following description of the preferred embodiments taken in connection with the accompanying drawings, wherein:

FIG. 2 is a schematic elevational view illustrating an embodiment of the apparatus for treating exhaust gases according to the present invention;

FIG. 3 is a side elevation viewed from the direction of the arrow III of the apparatus shown in FIG. 2;

FIG. 4 is a schematic view illustrating a measuring apparatus for conducting air permeability test of a sample of the exhaust gas filter according to the present invention; and FIG. 5 is a schematic, enlarged view illustrating a sample-receiving cylinder of the apparatus for conducting air permeability test shown in FIG. 4.

DESCRIPTION OF THE PREFERRED EMBODIMENTS

Figure 1A:
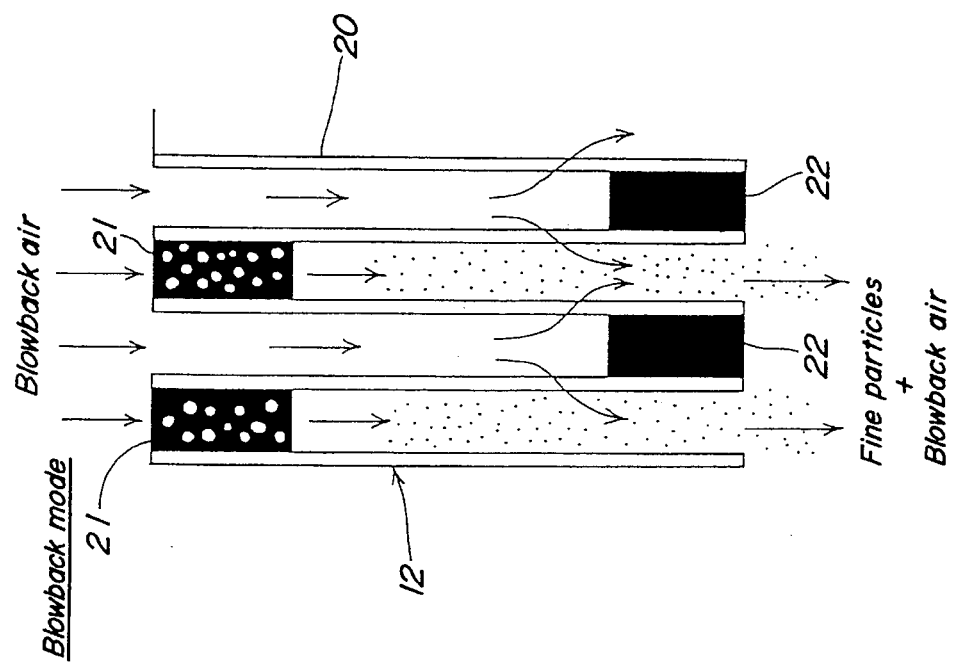
FIGS. 1A and 1B are schematic views illustrating an embodiment of the exhaust gas filter according to the present invention.

An embodiment of the apparatus for treating exhaust gases according to the present invention is shown in FIGS. 2 and 3.

In the apparatus for treating exhaust gases shown in FIG. 2, during usual exhaust gas filtration (the usual exhaust gas filtration is referred to as "collection mode" hereinafter), exhaust gases flow from an exhaust pipe 11 into each of exhaust gas filters 12. During the collection mode, since each exhaust valve 13 is opened, the exhaust gases flow into each exhaust gas filter 12 where fine particles mainly comprising carbon, contained in the exhaust gases, are collected, and then the exhaust gases are discharged from the exhaust gas treating apparatus 10.

During blowback-to-regenerate (the blowback-to-regenerate is referred to as "blowback mode" hereinafter), an exhaust valve 13, such as the lower exhaust valve 13 in FIG. 2, is closed to stop flowing of the exhaust gases into exhaust gas filters 12 to be regenerated, and a solenoid valve 14 is opened to inject blowback air into the exhaust gas filters 12. Thus, the gas filters are regenerated. Fine particles discharged are pneumatically conveyed to a collector tank 15 i.e., a device for receiving the collected fine particles. The conveyed and collected fine particles are disposed of by burning with an electric heater, burner or the like (not shown), or recovered by dismounting the collector tank 15 from the exhaust gas treating apparatus 10.

Figure 1B:
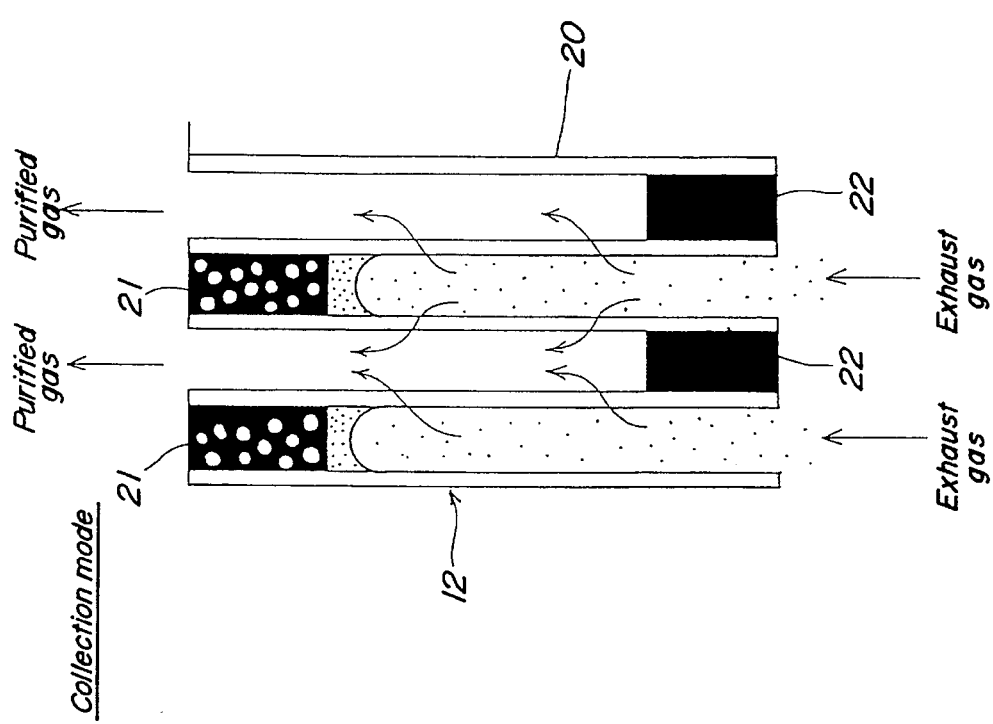

The exhaust gas filter 12 comprises a honeycomb structure, as shown in FIGS. 1A and 1B, having a number of gas flow passages defined by partition walls 20, part of the gas flow passages are plugged up at downstream end portion thereof with a first sealing member 21 and the rest of the gas flow passages are plugged up at an upstream end portion thereof with a second sealing member 22. The other end portions opposite to the first sealing members 21 or second sealing members 22 of the passages are open.

(1) In the collection mode, as shown in FIG. 1A, the exhaust gas flows into the exhaust gas filter 12 from the second sealing member 22 side and, after fine particles are collected on the first sealing members 21, passes through the partition walls 20, entering into the gas flow passages that have the sealing member 22 and then is discharged from the exhaust gas filter 12 to the outside.

(2) In the blowback mode, as shown in FIG. 1B, blowback air is injected from the downstream side of the exhaust gas into the exhaust gas filter 12. The injected blowback air that passes through the first sealing members 21, effectively releasing fine particles deposited right below the first sealing members 21, blows the released particles out towards the upstream side of the exhaust gas. The blowback air entering the gas flow passages having the second sealing member 22 passes through the partition walls 20 into the gas passages having the first sealing member 21, and releases fine particles deposited on the partition walls 20. The released fine particles are pneumatically conveyed by the blowback air and collected in the collector tank 15 i.e., a device for receiving fine particles, shown in FIGS. 2 and 3.

A cylindrical honeycomb structure with a diameter of 120 mm, a length of 150 mm, a partition wall thickness of 430 μm and a cell density of 15.5 cells/cm$^2$ was manufactured, which had characteristics as shown in Table 1.

TABLE 1

| Porosity (%) | Average pore diameter (μm) | Air permeation time (sec) |
|---|---|---|
| 45 | 15 | 20.5 |

In the above table, the cell density means the number of the gas flow passages per a unit area in the cross-sectional plane perpendicular to the gas flow passages of the exhaust gas filter. A part of these gas flow passages were plugged up, at an upstream end portion thereof (along a direction of the exhaust flow), with a sealing member composed of the same material as that of the honeycomb structure. The rest of the gas flow passages were plugged up, at a downstream end portion thereof (along a direction of the exhaust flow), with one of the sealing members Nos. 1–11 having different characteristics, shown in Table 2.

TABLE 2

| Sealing member No. | Porosity (%) | Porosity Ratio to partition wall*1 (%) | Average pore diameter of sealing member (μm) | Air permeation time (sec) | Air permeation time Ratio to partition wall*2 (%) |
|---|---|---|---|---|---|
| 1 | 40 | 89 | 14 | 37.3 | 182 |
| 2 | 45 | 100 | 15 | 20.5 | 100 |
| 3 | 50 | 111 | 15 | 18.0 | 88 |
| 4 | 50 | 111 | 24 | 14.2 | 69 |

TABLE 2-continued

| Sealing member No. | Porosity (%) | Ratio to partition wall*[1] (%) | Average pore diameter of sealing member (μm) | Air permeation time (sec) | Ratio to partition wall*[2] (%) |
|---|---|---|---|---|---|
| 5 | 55 | 122 | 15 | 13.9 | 68 |
| 6 | 55 | 122 | 25 | 11.1 | 54 |
| 7 | 55 | 122 | 50 | 6.1 | 30 |
| 8 | 60 | 133 | 15 | 5.9 | 29 |
| 9 | 60 | 133 | 24 | 4.7 | 23 |
| 10 | 60 | 133 | 50 | 2.4 | 12 |
| 11 | 65 | 144 | 15 | 1.6 | 8 |

In Table 2, the ratio to partition wall*[1](%) and the ratio to partition wall*[2](%) are represented by the following equations, respectively.

| | |
|---|---|
| Ratio to partition wall*[1] = | (porosity of sealing member/porosity of partition wall material) × 100 |
| Ratio to partition wall*[2] = | (air permeation time of sealing member/air permeation time of partition wall material) × 100 |

The porosity was determined by the method according to JIS R-2206.

The average diameter of the micropores was determined by a mercury injection method.

The air permeation time was determined with a measuring apparatus 30 as shown in FIG. 4. A sample 40 was set in a sample-receiving cylinder 31 as shown in FIG. 5, around which was sealed tight with a sealant 41 to prevent leakage. The upper surface of the sample 40 was exposed to the atmosphere. As the sealant 41, use may be preferably made of a vacuum grease, TEFLON® rubber or the like. The thickness c and the diameter d of the sample 40 were 430 μm and 5 mm, respectively. A sample of the partition wall was cut out from the honeycomb into a shape having a thickness accordant in direction with the thickness of the partition wall. A sample of the sealing member was cut into a shape having a thickness accordant in direction with the depth of the sealing member. In the examples, a sample-receiving cylinder 31 provided with an aperture 31a having a diameter e of 0.6 mm was used. However, in the present invention, in the case where the sample is thick enough to prolong the air permeation time with the above aperture, an aperture having a larger diameter may be provided.

The measuring procedure will be explained hereinafter making reference to FIGS. 4 and 5.

As shown in FIG. 5, a sample-receiving cylinder 31 in which a sample 40 has been set is fixed on the upper end of a measuring apparatus 30 as shown in FIG. 4. The lower stopcock 32 is closed. Then, the four-way cock 33 is turned to introduce water from a cistern 34 into a main column 35 and a side tube 36. When the water level has reached just above an upper graduation 36a on the side tube, the four-way cock is turned to stop the water feeding.

Then, the lower stopcock 32 is opened, whereby air passes downwards through the sample 40, flows into an air tube 37, comes out from an opening 37a formed on the tip of the air tube 37 and is introduced into the measuring apparatus 30. The water in the measuring apparatus 30 runs out from the lower stopcock 32 due to the water-head (a+b) between the upper level of the water in the measuring apparatus and the lower stopcock 32 level. The side tube is graduated so that the quantity of the water running out can be read. Thereby, a time required for 20 cc of the water to run out is measured. The time required for 20 cc of the water to run out is determined by the time for the water level to descend from the upper graduation 36a down to the lower graduation 36b on the side tube 36. The measured time is to represent an air permeation time. Thus, the "ratio to partition wall*[2]" is calculated from values of air permeation time determined for a sealing member and a partition wall material of a honeycomb. The measurement is conducted at 20° C.

The sealing members shown in Table 2 were made different in air permeation time from each others by changing porosity and average pore diameter thereof, which were produced by admixing the material of the honeycomb structure having the characteristics shown in Table 1 with a pore-forming agent, foaming agent or the like. As the pore-forming agent, foamable methylcelluloses, polyurethanes or the like may be employed in various quantities and particle diameters, in addition to commonly used graphite, flour or the like. As the sealer, ceramic fibers, cordierite particles, LAS (lithium aluminosilicate)—based foam adhesives or the like may be employed.

With respect to exhaust gas filters manufactured as explained above, a pressure loss and a collection efficiency are shown in Table 3. The characteristics of the various exhaust gas filters were determined when the exhaust gas filters were used in an apparatus for treating exhaust gases as shown in FIGS. 2 and 3, with a 2,000 cc diesel engine as an exhaust gas source, under the operation conditions of: an exhaust gas temperature of 400° C.; an average output of fine particles in the exhaust gas of 17 g/hr.; an exhaust gas flow rate of 3 $m^3$/min.; a blowback air pressure of 6 Kgf/$cm^2$; an interval of blowback regeneration operations of 5 min.; and a duration of blowback air injection of 0.5 sec.

TABLE 3

| Example No. | Sealing member No. | Collection Efficiency (%) | Pressure loss (mmH$_2$O) | Evaluation |
|---|---|---|---|---|
| Example 1 | 4 | 95.5 | 1000 | good |
| Example 2 | 5 | 96.0 | 950 | good |
| Example 3 | 6 | 95.0 | 900 | good |
| Example 4 | 7 | 93.0 | 800 | good |
| Example 5 | 8 | 94.5 | 750 | good |
| Example 6 | 9 | 93.5 | 700 | good |
| Example 7 | 10 | 92.0 | 650 | good |
| Comparative Example 1 | 1 | 97.5 | 1400 | poor |
| Comparative Example 2 | 2 | 97.0 | 1300 | poor |
| Comparative Example 3 | 3 | 96.5 | 1100 | poor |
| Comparative Example 4 | 11 | 88.5 | 550 | poor |

The collection efficiency was represented by a ratio of a total quantity of fine particles collected in the collector tank 15 to a total quantity of fine particles fed into the apparatus for treating exhaust gases from the engine over three hours from the commencement of the test. The quantity of fine particles fed into the exhaust gas treating apparatus is determined by sampling, at a predetermined interval, the exhaust gas discharged per a unit time from the exhaust pipe 11 shown in FIG. 2, during operating the engine, and calculating the total output of the fine particles for 3 hours, based on the average contents measured in the exhaust gas samples.

The pressure loss was represented by a pressure loss of the exhaust pipe 11 shown in FIG. 2, measured in the collection mode.

Performances of an exhaust gas filter were evaluated by the collection efficiency and pressure loss, i.e., in the case where the conditions of a collection efficiency of 90% or more and a pressure loss of 1,000 mmH$_2$O or less were satisfied, the performance of the exhaust gas filter was evaluated as good and otherwise as poor.

As shown in Table 3, the exhaust gas filters of Examples 1–7 comprise the sealing members Nos. 4–10, respectively, which sealing members Nos. 4–10 have an air permeation time about 10–70% of that of the honeycomb structure as shown in Table 2. In the above exhaust gas filters of Examples 1–7, the pressure loss is decreased as the collection efficiency is maintained at above 90%. Alternatively, the exhaust gas filters of Examples 4–7 amongst the above, comprise the sealing members Nos. 7–10, respectively, having an air permeation time about 10–30% of that of the honeycomb structure, show further decreased pressure losses as maintaining the collection efficiency at above 90% and are, therefore, more preferred. On the other hand, as is understood from the exhaust gas filter shown in Comparative Examples 1–3, when the air permeation time of the sealing member exceeds 70% of that of the honeycomb structure, the pressure loss exceeds 1,000 mmH$_2$O and thereby the flow rate of the exhaust gas will be decreased. Alternatively, when, as Comparative Example 4, the air permeation time of the sealing member is less than 10% of that of the honeycomb structure, though the pressure loss is decreased, the collection efficiency is decreased to less than 90%, which poses a problem such that fine particles contained in exhaust gases can not be effectively collected.

It is understood from Table 2 that the porosities of the sealing members Nos. 4–10 having an air permeation time about 10–70% of that of the honeycomb structure are in the range of 110–140% of the porosity of the honeycomb structure. When the porosity is less than 110%, even if the diameter of the micropores is changed, the blowback air hardly can pass through the sealing member. When the porosity exceeds 140%, though the pressure loss decreases, the collection efficiency becomes less than 90%, so that fine particles in exhaust gases can not be collected sufficiently.

Next, exhaust gas filters were fabricated with the sealing members Nos. 2, 4 and 10 shown in Table 2, with depths changed as shown in Table 4. The collection efficiency, pressure loss and the conditions after testing, of the sealing members, were examined. The results are shown in Table 4.

TABLE 4

| Example No. | Sealing member No. | Depth of sealing member (mm) | Ratio to partition wall (time) | Collection efficiency (%) | Pressure loss (mmH$_2$O) | Condition of sealing member | Evaluation. |
| --- | --- | --- | --- | --- | --- | --- | --- |
| Example 8 | 4 | 25 | 58.1 | 95.5 | 1000 | ⊙ | good |
| Example 9 | 4 | 13 | 30.2 | 95.0 | 950 | ⊙ | good |
| Example 10 | 4 | 12 | 28.0 | 95.0 | 950 | ○ | good |
| Example 11 | 4 | 5 | 11.6 | 94.0 | 900 | ○ | good |
| Example 12 | 10 | 25 | 58.1 | 92.0 | 650 | ⊙ | good |
| Example 13 | 10 | 13 | 30.2 | 91.5 | 550 | ⊙ | good |
| Example 14 | 10 | 12 | 28.0 | 91.5 | 550 | ○ | good |
| Example 15 | 10 | 5 | 11.6 | 90.5 | 500 | ○ | good |
| Comparative Example 5 | 2 | 25 | 58.1 | 97.0 | 1200 | ⊙ | poor |
| Comparative Example 6 | 2 | 13 | 30.2 | 96.0 | 1200 | ⊙ | poor |
| Comparative Example 7 | 2 | 12 | 28.0 | 96.0 | 1200 | ○ | poor |
| Comparative Example 8 | 2 | 5 | 11.6 | 95.5 | 1150 | ○ | poor |
| Comparative Example 9 | 2 | 3 | 7.0 | 95.0 | 1150 | X | poor |
| Comparative Example 10 | 4 | 27 | 62.8 | 96.0 | 1050 | ⊙ | poor |
| Comparative Example 11 | 4 | 3 | 7.0 | 93.0 | 900 | X | poor |
| Comparative Example 12 | 10 | 3 | 7.0 | 89.5 | 500 | X | poor |

In Table 4, the ratio to partition wall is represented by the following formula.

The ratio to partition wall=Depth of sealing member/ thickness of partition wall Performance of an exhaust gas filter were evaluated by the collection efficiency, pressure loss and conditions after testing of the sealing member, i.e., in the case where the requirements of: a collection efficiency of 90% or more; a pressure loss of 1,000 mmH$_2$O or less; and the conditions after testing of the sealing members being judged as ⊙ or ○, were all satisfied, the performance of the exhaust gas filter was evaluated as good and otherwise as poor. With respect to the conditions of the sealing member, the sign ⊙ denotes a very good condition wherein the sealing members have uniform depths; the sign ○ denotes a good condition; and the sign x denotes a poor condition wherein the sealing members are partly broken.

As shown in Table 4, it is understood that the exhaust gas filters comprising sealing members having a depth in the range of 10–60 times the thickness of the partition walls of the honeycomb structure are of good performance, exhibiting a collection efficiency of 90% or more, a pressure loss of 1,000 mmH$_2$O or less and a condition ⊙ or o of the sealing members. It has been found to be much preferred that the depth of the sealing members is in the range of 30 to 60 times the thickness of the partition walls of the honeycomb structure, that is deemed to be substantially uniform, from the viewpoint of mechanical strength. In Comparative Examples 5-8 wherein sealing members having an air permeation time exceeding 70% of that of the honeycomb structure were used, the pressure loss was not less than 1,000 mmH$_2$O, even when the depths of the sealing members were within the range of 10-60 times the thicknesses of the partition walls of the honeycomb structure. Alternatively, it has been found that the depths of the sealing members exceeding 60 times the thicknesses of the partition walls of the honeycomb structure will increase in the pressure loss and, on the other hand, the depths of the sealing members less than 10 times the thicknesses of the partition walls of the honeycomb structure will appreciably decrease in the mechanical strength of the sealing members.

In the examples of the present invention explained above, a material exhibiting a high collection efficiency, resulting in a low pressure loss, was employed to form only sealing members positioned at the blowback air outlet side i.e., downstream the exhaust flow. However, according to the present invention, the same material can be employed also to form sealing members positioned upstream the exhaust flow.

What is claimed is:

1. An apparatus for treating exhaust gas, comprising:

a honeycomb structure having a plurality of partition walls defining a plurality of throughholes extending along an axial direction, the honeycomb structure having first and second opposite axial ends, the throughholes forming two groups, a first group which is open at the first axial end and plugged via first sealing members at the second axial end, and a second group which is plugged via second sealing members at the first axial end and open at the second axial end, wherein the first group of throughholes is adapted to receive exhaust gas, the second group of throughholes is adapted to receive blowback air, and the first sealing members have a three-dimensional micropore structure including interconnected pores that allow blowback air to pass therethrough such that said first sealing members have an air permeation time that is less than an air permeation time of the partition walls of the honeycomb structure; and a device for receiving fine particles that are collected by the honeycomb structure and removed therefrom by flow of blowback air through the honeycomb structure.

2. An exhaust gas filter, comprising:

a honeycomb structure having a plurality of partition walls defining a plurality of throughholes extending along an axial direction, the honeycomb structure having first and second opposite axial ends, the throughholes forming two groups, a first group which is open at the first axial end and plugged via first sealing members at the second axial end, and a second group which is plugged via second sealing members at the first axial end and open at the second axial end, wherein the first group of throughholes is adapted to receive exhaust gas, the second group of throughholes is adapted to receive blowback air, and the first sealing members have a three-dimensional micropore structure including interconnected pores that allow blowback air to pass therethrough such that said first sealing members have an air permeation time that is less than an air permeation time of the partition walls of the honeycomb structure.

3. The exhaust gas filter of claim 2, wherein the air permeation time of the first sealing members is 10-70% of the air permeation time of the partition walls of the honeycomb structure.

4. The exhaust gas filter of claim 2, wherein said first sealing members extend into the first throughholes a depth that is 10-60 times greater than a thickness of the partition walls.

5. The exhaust gas filter of claim 2, wherein said first sealing members have a porosity of 110-140% of a porosity of the partition walls.

* * * * *